Jan. 18, 1955 I. H. C. GREEN Re. 23,928

METHOD OF KNITTING

Original Filed Nov. 17, 1950 2 Sheets-Sheet 1

INVENTOR:-
ISAAC H. C. GREEN
BY
ATT'Y.

United States Patent Office

Re. 23,928
Reissued Jan. 18, 1955

23,928

METHOD OF KNITTING

Isaac H. C. Green, Pawtucket, R. I., assignor to Hemphill Company, Central Falls, R. I., a corporation of Massachusetts Original No. 2,588,718, dated March 11, 1952, Serial No. 196,157, November 17, 1950. Application for reissue August 12, 1954, Serial No. 449,537

6 Claims. (Cl. 66—201)

Matter enclosed in heavy brackets [ ] appears in the original patent but forms no part of this reissue specification; matter printed in italics indicates the additions made by reissue.

This invention relates to a method of knitting plain hosiery fabric which is ornamented by diagonal lines of contrasting color composed of knitted loops which are interknitted with adjacent loops and are not superimposed thereon.

Figure 1:
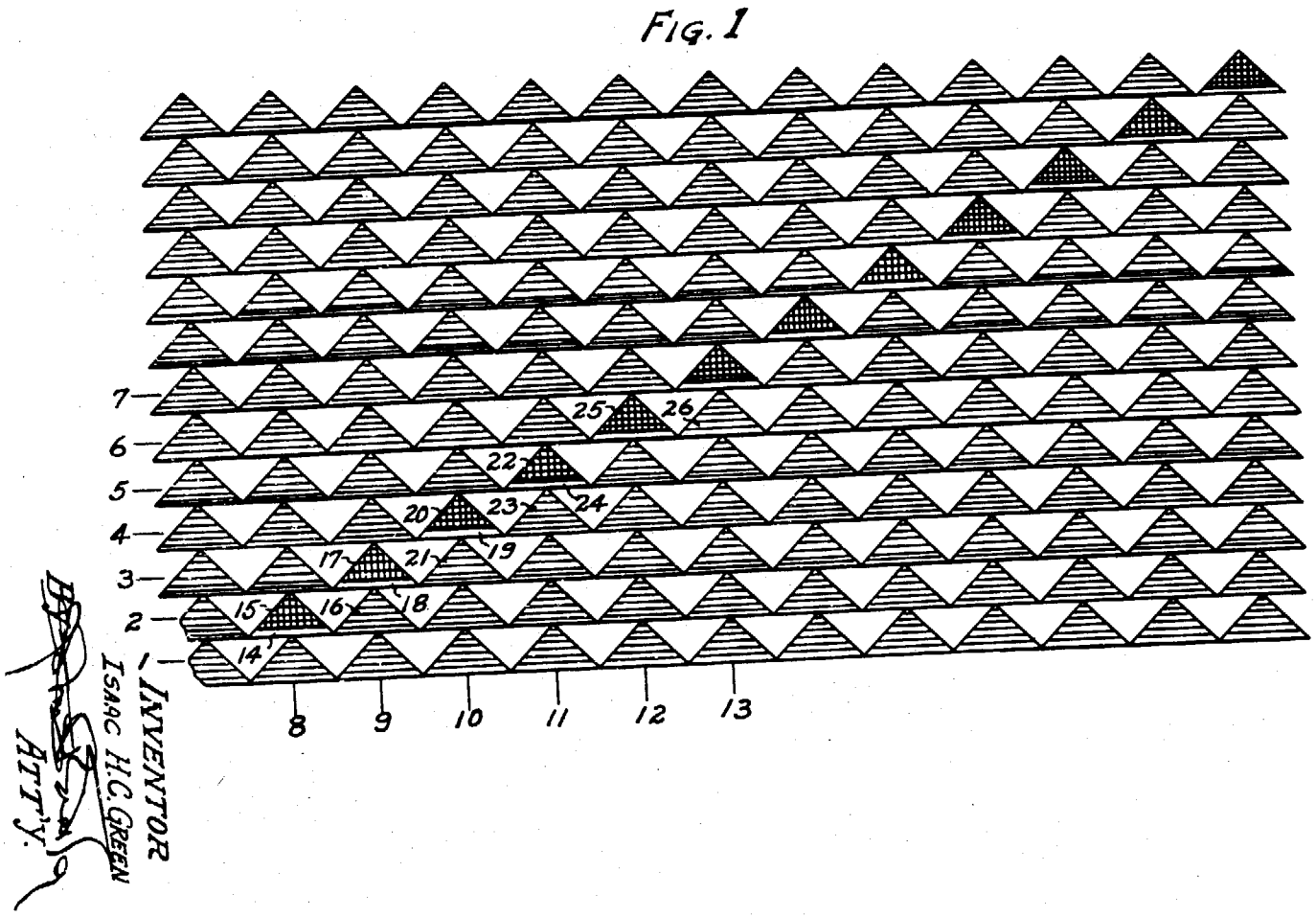
Figure 2:
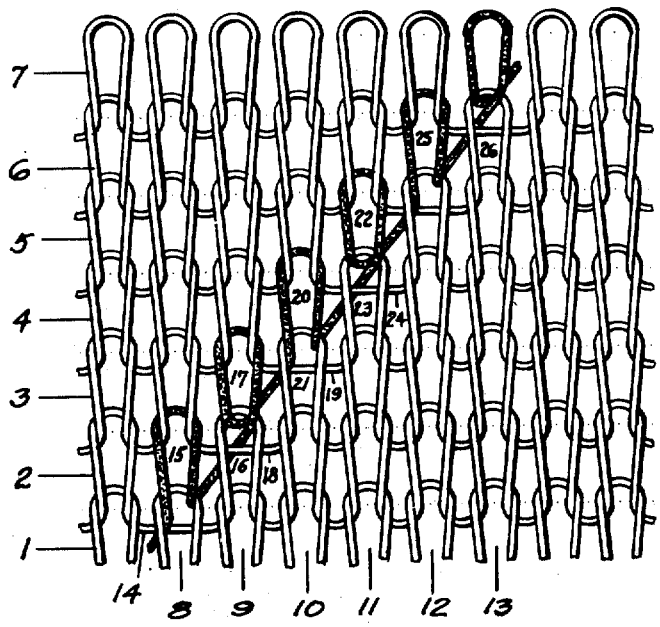

Figures 1 and 2 of the drawing illustrate diagrammatically a section of knitted fabric having such a diagonal line.

Referring to the drawing, the first course 1 is assumed to have been knit from left to right. It is composed of a series of plain knitted loops of a body yarn of a single color. Course 2 is knit in the opposite direction, i. e., from right to left and is also composed of a series of similar loops of the same yarn knitted through the loops of the first course in every wale with the exception of wale 8 across which it is floated as shown at 14.

The knitting of the body yarn is now discontinued and a second yarn which will be called herein the overlay yarn is knitted from left to right into wale 8 as shown at 15 by being knit through the loop of the corresponding wale in course 1. It is also knit from right to left through the body yarn loop 16 of course 2 as shown at 17.

The knitting of the overlay yarn is now stopped and course 3 is completed by knitting the body yarn from left to right through all of the loops of course 2 including the loop 15 of the overlay yarn and with the exception that it is not knitted but floated past loop 17 of the overlay yarn as shown at 18. The direction of knitting is now reversed again and course 4 is knitted from right to left of the body yarn through all of the loops of course 3 with the exception of wale 10 across which it is floated as shown at 19. Changing yarns again to the overlay yarn and knitting from left to right, loop 20 is knitted through loop 21 in the wale 10 of course 3 and reversing direction again loop 22 is also knitted through loop 23 of course 4. Then the yarn is changed again to the body yarn and course 5 is completed by knitting it from left to right through all of the loops of course 4 with the exception of the wale occupied by overlay yarn loop 22 behind which it is floated as at 24. The next course 6 is also knit of the body yarn but from right to left through all of the loops of course 5 with the exception of wale 12 across which it is floated. Then the knitting of the body yarn is discontinued and the overlay yarn is knitted into wale 12 of course 6 as shown at 25. Also, it is knitted into wale 13 through body yarn loop 26 of course 6. This loop will be included in course 7 when this sequence is repeated as required to obtain the desired length of diagonal stripe or line formed by the overlay yarn.

Also, as will be obvious, the overlay stripe may be knitted in the opposite diagonal direction to form crosses, diamonds, angles or other decorative shapes and it may be utilized in the knitting of hosiery such, for example, as the well known reciprocatorily knit solid color diamond or argyle stockings in which it may form a narrow stripe bisecting in each diagonal direction the usual combination of diamond patterns. On the other hand, it may be utilized to form other patterns within such diamonds.

Although the overlay stripe described above consists of a single loop in each course offset from the corresponding loop of the preceding course by a single wale, broader stripes may be obtained by knitting two or more consecutive loops of the overlay yarn in each instance and offsetting both of them in the manner described above. In such a case, the body yarn would, of course, be floated behind the two or more overlay yarn loops in each instance. Also, if desired, the offset may be of more than a single wale thus changing or varying the slope of the overlay stripe.

Reference herein to a course of knitting does not necessarily refer to a complete course as in a circular knit stocking, for example, but to any part of a fabric.

Although this invention has been shown and described as consisting of plain knitted fabric knitted into each course of which is a single loop of another yarn, each of these loops being offset from the previous similar loops so that single course offsets are created, it will be understood that two course offsets can be produced by knitting two identical courses of the body yarn, each having a float in the same wale or wales, knitting into these wales the other or overlay yarn and then repeating the process with the exception that the float in each of the next two courses of the body yarn is offset from the corresponding float in each of the two preceding courses.

I claim:

1. A method of knitting which includes the steps of knitting two consecutive courses of a body yarn in each of which the yarn is floated across a space equal to at least one wale and knitting an overlay into each float[ed] wale, the overlay yarn in one course being knitted subsequently to the formation of the float and, in the other course, being knitted prior to the formation of the float.

2. A method of knitting which includes the steps of knitting two consecutive courses of a body yarn in each of which the yarn is floated across a space equal to at least one wale and knitting an overlay into each float[ed] wale, the overlay yarn in one course being knitted subsequently to the formation of the float and, in the other course, being knitted prior to the formation of the float and being offset by at least one wale in relation to the overlay knitted into said first mentioned course.

3. A method of knitting a design of a first yarn into a fabric of a second yarn which includes the steps of knitting, in a given course, a plurality of loops of said second yarn while floating said second yarn across *a* wale or wales of said course in which said design of said first yarn is to be incorporated; knitting in said float[ed] wale or wales *a loop or* loops of said first yarn; knitting, in a course next adjacent said given course, *a loop or* loops of said first yarn in a given wale or wales according to said design; and knitting, in said adjacent course, except in said given wale or wales, *a loop or* loops of said second yarn.

4. A method of knitting which includes the steps of knitting a partial course of consecutive loops of a body yarn floating the yarn across a space equal to that required for one loop and then completing the course by knitting consecutive loops, changing yarns to an overlay yarn and knitting a loop through the corresponding loop of a preceding course in the wale containing the float, knitting another loop of the overlay yarn through the loop of the first mentioned course adjacent to the wale in which a float occurred, then knitting a complete course of a body yarn with the exception that this yarn is floated across the wale in which the overlay yarn was last knitted and repeating this sequence as desired, the overlay yarn loop being offset in each succeeding course by at least one wale.

5. A method of knitting which includes the steps of knitting a partial course of consecutive loops of a body yarn, floating the yarn across a space equal to that required for one loop and then completing the course by knitting consecutive loops, changing yarns to an overlay yarn and knitting a loop through the corresponding loop of a preceding course in the wale containing the float, knitting another loop of the overlay yarn through the loop of the first mentioned course offset by at least one wale from that in which the float occurred, then knitting a complete course of the body yarn with the exception that this yarn is floated across the wale in which the overlay yarn was last knitted and repeating this sequence as desired, the overlay yarn loop being offset in each succeeding course by at least one wale.

[6. A method of knitting which includes the steps of knitting a partial course of consecutive loops of a body yarn floating the yarn across a space equal to that required for one or more loops and then completing the course by knitting consecutive loops, changing yarns to an overlay yarn and knitting a loop through each of the corresponding loops of a preceding course in the wale or wales containing the float, knitting the same number of loops of the overlay yarn through loops of the first mentioned course offset to the extent of at least one loop from the wale or wales in which the float occurred, then knitting a complete course of the body yarn with the exception that this is floated across the wale or wales in which the overlay yarn was last knitted and repeating this sequence as desired, the overlay yarn loops being offset in each succeeding course by at least one wale.]

*7. A method of knitting which includes the steps of knitting a partial course of consecutive loops of a body yarn, floating the yarn across a space equal to that required for one or more loops and then completing the course by knitting consecutive loops, changing yarns to an overlay yarn and knitting a loop or loops through the corresponding loop or loops of a preceding course in the wale or wales containing the float, knitting the overlay yarn in the wale or wales of the first mentioned course offset to the extent of at least one wale from the wale or wales in which the float occurs, then knitting a complete course of the body yarn with the exception that this yarn is floated across the wale or wales in which the overlay yarn was last knitted, and repeating this sequence as desired, the overlay yarn loop or loops being offset in each succeeding course by at least one wale.*

References Cited in the file of this patent or the original patent

UNITED STATES PATENTS

| | | |
|---|---|---|
| 2,451,214 | Green | Oct. 12, 1948 |
| 2,680,961 | Thurston | June 15, 1954 |